United States Patent [19]

Scharrer

[11] 3,925,342
[45] Dec. 9, 1975

[54] POLYMERIZATION OF UNSATURATED FATTY MATERIALS

[75] Inventor: Roland Pierre Franz Scharrer, Pelham, N.Y.

[73] Assignee: Arizona Chemical Company, New York, N.Y.

[22] Filed: Oct. 15, 1973

[21] Appl. No.: 406,736

[52] U.S. Cl. .............................. 260/97.5; 260/407
[51] Int. Cl.$^2$ ........................................ C09F 7/06
[58] Field of Search ...................... 260/407, 97.5

[56] References Cited
UNITED STATES PATENTS 2,219,862  10/1940  Bradley et al. ..................... 260/407
3,784,537  1/1974  Scharrer ............................ 260/97.5

OTHER PUBLICATIONS

Chemical Abstracts, Vol. 79, 68075q (Sept. 24, 1973).

*Primary Examiner*—Nicholas S. Rizzo
*Assistant Examiner*—Diana G. Rivers
*Attorney, Agent, or Firm*—Harry H. Kline

[57] ABSTRACT

A process for treating unsaturated fatty materials is given whereby they are polymerized in a homogeneous system by heating in the presence of an hydroxy aryl thiol, to yield a product having a high dimer to trimer ratio.

7 Claims, No Drawings

POLYMERIZATION OF UNSATURATED FATTY MATERIALS

This invention relates to the polymerization of unsaturated fatty acids and their derivatives. More specifically, it relates to the polymerization of unsaturated fatty acids to yield products having a high dimer to trimer ratio.

Dimer and trimer acids are widely used in commerce where they have found use in polyamide and polyester polymer applications and as anticorrosives. Polyamides find use mainly in adhesive applications while polyesters are often used in surface coating applications. This invention provides a novel means for producing these acids. In the manufacture of dimer, trimer, and even tetramer compounds, the process is often called polymerization or dimerization, and these terms will be used interchangeably hereinbelow.

As is known, clay catalysts have been employed to effect the polymerization of fatty intermediates as disclosed by in United States Pat. Nos. 2,482,761, 2,664,429, 2,793,219 and 2,793,220. Generally, clay catalyst processes involve the heating of unsaturated fatty acids for from 4 – 12 hours at 200°– 280°C. in the presence of about 4% by weight of acidic clay and 2% water in a pressure reactor to cause dimerization. The product is separated from the clay and treated with phosphoric acid. The by-product monomer from the clay process is finally removed by distillation. This by-product monomer has found little use and has almost no economic value. A variety of other processes are known but have not been employed in commerce because of technical and economic problems.

One main disadvantage of prior art processes lies in the low dimer to trimer acid ratio of the final product. While both are formed, the dimer is more desired. Other disadvantages of the prior art include a difficult filtration step, the loss of product in the discarded clay catalyst, and the production of a rearranged by-product monomer which has little economic utility.

The process of this invention substantially circumvents and overcomes these disadvantages.

It has surprisingly been found that by use of an effective amount of an hydroxy aryl thiol catalyst, it is possible to produce a dimerized product having a high dimer to trimer ratio. Moreover, the recovered by-product monomer exhibits little if any chain isomerization and, therefore, has none of the disadvantage of the prior art. More surprisingly is the fact that no catalyst removal step is required. Another advantage of this invention is that the monomer can be stripped out from the dimer-trimer mixture and can be used as an oleic acid substitute, substantially contributing to the economics of the process. Yet another advantage of my invention is that the process can be operated at convenient atmospheric pressure or under elevated pressures. In the clay process described above, 40 – 50% of the original feed is recovered as rearranged monomer and must be disposed of. Since this process does not require an acid clay catalyst reaction, conditions are relatively mild even at these elevated temperatures. Generally, it is a good practice to carry out the process of the invention in the presence of steam. Other advantages will become evident from a reading of the ensuing description.

The catalysts found useful in the practice of the invention are organic sulfur-containing compounds which can be defined as follows:

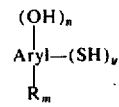

where $n$ is an integer from 1 to 4 inclusive, $y$ is an integer from 1 to 3, inclusive, $m$ is an integer from 0 to 4, and the sum of $m$, $n$, and $y$ cannot exceed the substitutable positions on the aryl ring, R is a hydrocarbon group, such as, but not limited to alkyl, cycloalkyl, and substituted alkyl, including but not limited to carbon containing compounds from 1 to 10 carbon atoms inclusive and these can be a substituent group consisting of cycloalkyl, aryl, and alkaryl. Preferred alkyl groups are straight chained, secondary, and tertiary alkyl groups containing up to 8 carbon atoms inclusive. Preferred aryl groups are those containing 6 to 14 carbon atoms inclusive. Typically included are phenyl, naphthyl, and phenanthryl. Typical cycloalkyl groups contain 3 to 6 carbon atoms in the ring and include but should not be limited to cyclopropyl, cyclopentyl, and cyclohexyl. Included are compounds and position isomers having R groups of mixed character; when more than one R group is present on the aryl ring, such groups may be identical or different.

Illustrative preferred catalysts include:
1-thiol-2-naphthol,
5-t-butyl-1-thiol-2-naphthol,
2,4-dihydroxythiophenol, and
2-hydroxythiophenol In the instant specification, an "effective amount" of catalyst is meant sufficient concentration of the same to provide catalytic formation of the dimer-trimer products. The amounts may be further described as minor or catalytic amounts ranging from about 0.01% by weight of the feed composition to 2.0%.

While unsaturated vegetable and animal fatty acid materials may be employed, particularly desirable materials include but are not limited to tall oil fatty acids, distilled tall oils, unsaturated fatty acid esters, soy fatty acids, soybean oils, linoleic acids, cotton seed fatty acids, mixtures thereof and others. It should be apparent that in the practice of this invention, any fatty acid containing a major amount of diene fatty acid is operative.

The spent catalyst does not require removal by filtration or other means and, uniquely, little effect has been found on end use utility which can be attributed to the presence of catalyst or catalyst fragments. Of course, if found necessary, the catalyst or catalyst fragments may be removed by conventional means.

The reaction to polymerize should be permitted to run until the desired dimer level is obtained. Generally, a dimer content of 15% is satisfactory. The maximum dimer-trimer content can be used as a measure of completeness of reaction. The dimer to trimer ratio is normally greater than three (3).

Temperatures of from about 200°C. to 300°C., or higher, may be employed. Higher temperatures will require shorter times for the reaction to reach completion. Generally, from 1 to 16 hours is employed. A preferred temperature of from 250°C. to 300°C. requires from 2 to 12 hours to produce economic yields of polymerized fatty materials.

Simple stripping of the by-product monomer from a typical reaction mixture produces a dimer-trimer residue which can be used as such or fractionated further to produce distilled dimerized fatty acids and a higher polymeric residue. It should be noted that analyses by gas-liquid chromatography and ozonolysis shows that the recovered by-product monomer contains from 70 to 80% of oleic and elaidic acids. Ozonolysis of recovered monomer from the prior art clay dimerization processes indicates that little oleic or elaidic acid is present.

Although the chemistry of the hereinabove defined process is not well understood, it appears evident that polyunsaturated, generally conjugatable olefins are involved. Linoleic acid is a typical example. A free carboxyl group is not required since esters can be dimerized. A percentage of the oleic or monounsaturated acidic material may participate. In any event, as shown in the examples and particularly in Example 1, below, the rapid disappearance of linoleic acid occurs with the concomitant appearance of dimerized product. It is unclear whether this reaction is free radical or ionic in mechanism, although a free radical inhibitor does not appear to substantially change the process.

The following examples are presented to exemplify the invention but are not limitative thereof, except as appears in the appended claims. All parts and percentages are by weight unless it appears otherwise.

EXAMPLE 1

This example, as well as Examples 2 and 3, below, illustrate the fact that linoleic acids are readily converted to polymeric fatty acids. The remaining monomeric fatty acids are rich in oleic type acids.

The starting material for this example is a commercial tall oil fatty acid fraction with the following composition and properties:

| | |
|---|---|
| Fatty Acids, total % | 99.0 |
| Rosin Acids, % | 0.5 |
| Unsaponifiables, % | 0.5 |
| Fatty Acid Composition: | |
| Linoleic Acids, % | 32 |
| Oleic Acids, % | 55 |
| Other Acids | 13 |
| Color Gardner (1963) | 13 |
| Acid Value | 198 |
| Saponification Value | 200 |

The fatty acid is heated with stirring in a glass reactor at 250°C. for six hours with 0.5% 1-thiol-2-naphthol. A steam blanket was used to prevent oxidation and anhydride formation. The reaction product at the end of this period contained 18.3% of the dimer-trimer fatty acid, with a dimer/ trimer ratio of 5.8.

Vacuum stripping of the reaction mixture at 0.2 mm pressure provided a volatile fraction rich in oleic-type acids, and a residue rich in polymeric (dimer-trimer) fatty aicds. Their analyses are listed in Table I below:

TABLE I

| Distillate | | |
|---|---|---|
| Yield [a] | | 79.5% |
| Composition: | | |
| Oleic-type Acids | 75.8% | |
| Linoleic Acids | 6.3% | |
| Other Fatty Acids | 17.9% | |
| Total Fatty Acid Monomer | 100.0% | |
| Acid Value = 199.5 | | |
| Residue | | |
| Yield [a] | | 20.5% |
| Composition: | | |
| Fatty Acid Monomer | 14.8% | |
| Dimer | 70.1% | |

TABLE I-continued

| | | |
|---|---|---|
| Trimer | 15.1% | |
| Total Fatty Material | 100.0% | |
| Acid Value = 183 | | |
| Dimer/Trimer = 4.64 | | |
| Total | | 100.0% |

[a] Based upon starting fatty acid

The presence of elaidic acid (the trans isomer of oleic acid) is indicated by infrared (I.R.) analysis of the distillate. Gel-phase chromatography (gpc) was used to analyze for % monomer, dimer, and trimer fatty acids in the crude reaction mixture, distillate, and residue. This method of analysis has been described in Analytical Chemistry 40, 989 (1968).

Gas liquid chromatography (glc) is employed for the analysis of the fatty acid monomeric components.

EXAMPLE 2

The starting material for this example is the same as for Example 1, and is heated at 275°C. for six hours with 0.2% 1-thiol-2-naphthol in the presence of a steam blanket The reaction mixture contained 28.9% dimer-trimer fatty acid.

Vacuum distillation of the reaction mixture at 0.2 mm pressure gave a distillate rich in oleic type acids and a residue containing the dimer and trimer fatty acids. The analyses are listed below in Table II:

Table II

| Distillate | | |
|---|---|---|
| Yield [a] | | 70% |
| Composition: | | |
| Oleic-type Acids | 76.0% | |
| Linoleic Acids | 3.0% | |
| Other Fatty Acids | 21.0% | |
| Total Fatty Acid Monomer | 100.0% | |
| Acid Value = 204 | | |
| Residue | | |
| Yield [a] | | 30% |
| Composition: | | |
| Fatty Acid Monomer | 4.6% | |
| Dimer | 74.0% | |
| Trimer | 21.4% | |
| Total Fatty Material | 100.0% | |
| Acid Value = 187 | | |
| Dimer/Trimer = 3.46 | | |
| Total | | 100.0% |

[a] Based upon starting fatty acid

As a control to demonstrate non-catalyzed thermally induced polymerization the same fatty acid provides 14% of dimer and trimer fatty acid after a 6.0 hour heating period at 275°C.

EXAMPLE 3

The starting material for this example is the same as for Example 1, and was heated at 300°C. for 5.0 hours with 0.2% 1-thiol-2-naphthol in the presence of a steam blanket.

The reaction mixture analyzed for a 35% dimer-trimer content.

Vacuum distillation of the reaction mixture at 0.4 mm Hg. pressure gave a distillate rich in oleic type acids (both oleic and elaidic acids) and a residue containing the dimer and trimer fatty acids. The analyses are tabulated below in Table III.

Table III

| Distillate | |
|---|---|
| Yield [a] | 65.5% |
| Composition: | |
| Oleic-type Acids | 78% |
| Linoleic Acids | 3% |
| Other Fatty Acids | 19% |
| Total Fatty Acid Monomer | 100% |
| Acid Value = 197 | |

| Residue | |
|---|---|
| Yield [a] | 34.5% |
| Composition: | |
| Fatty Acid Monomer | 5.1% |
| Dimer | 71.4% |
| Trimer | 23.5% |
| Total Fatty Material | 100.0% |
| Acid Value = 182 | |
| Dimer/Trimer = 3.04 | |
| Total | 100.0% |

[a] Based upon starting fatty acid

EXAMPLE 4

This example demonstrates that reaction temperatures exceeding 300°C. will lead to loss of carboxyl group activity as seen by the low acid value of the residue, a poor dimer to trimer ratio (less than 2), and a reduction of the oleic acid content, in addition to complete conversion of the linoleic acids to polymeric acids.

The starting material for this example was the same as for Example 1, and was heated at 325°C. for 5.0 hours with 0.1% 1-thiol-2-naphthol in the presence of a steam blanket.

The final reaction mixture contained 49.5% polymeric fatty acid residue.

Vacuum distillation of the reaction mixture at 0.2 mm Hg. pressure yields a recovered monomer distillate and a residue containing the dimer and trimer fatty acids. The results of the analyses are listed below in Table IV:

Table IV

| Distillate | |
|---|---|
| Yield [a] | 52% |
| Composition: | |
| Oleic-type Acids | 68.4% |
| Linoleic Acids | 0. % |
| Other Fatty Acids | 31.6% |
| Total Fatty Acid Monomer | 100.0% |
| Acid Value = 210 | |

| Residue | |
|---|---|
| Yield [a] | 48% |
| Composition: | |
| Fatty Acid Monomer | 2.3% |
| Dimer | 59.6% |
| Trimer | 38.1% |
| Total Fatty Material | 100.0% |
| Acid Value = 150 | |
| Dimer/Trimer = 1.57 | |
| Total | 100% |

[a] Based upon starting fatty acid

EXAMPLE 5

This example demonstrates the low degree of fatty acid polymerization at temperatures lower than 250°C., i.e., 200°C.

The starting material for this example was the same as for Example 1, and was heated for 6.0 hours with 0.5% 1-thiol-2-naphthol in the presence of a steam blanket.

The reaction mixture analyzed for 7.9% dimer-trimer fatty acid, with a D/T ratio of 6.2.

EXAMPLE 6

The following example demonstrates that neutral compounds containing conjugated and non-conjugated dienes will undergo polymerization to give dimeric and trimeric products.

The isooctyl ester of the above-described fatty acid (acid number 1) was heated at 300°C. for 3.0 hours with 0.2% 1-thiol-2-naphthol in the presence of a steam blanket The reaction mixture analyzed for 22.1% dimer-trimer fatty product. Vacuum distillation of this material at 0.3 mm pressure separated the monomeric ester distillate from the dimer-trimer rich residue. The analyses of these cuts are listed below:

| | % Yield | | | | % Monomer | Acid Value |
|---|---|---|---|---|---|---|
| Distillate | 71.5 | | | | 100 | 19.0 |
| | %Yield | %Dimer | %Trimer | D + T | D/T | %Monomer | Acid Value |
| Residue | 28.4 | 64.8 | 12.2 | 77.0 | 5.3 | 23.0 | 14.6 |

The high acid number of the product is due to steam saponification of the ester. When this reaction is carried out under inert gas an acid number of 2 is obtained.

EXAMPLE 7

This example demonstrates that fatty materials other than tall oil can be successfully polymerized.

Soya fatty acid, analyzing for 22% oleic acid, 43% linoleic acids, 6% linolenic acid, and 29% other fatty acids is used.

By heating this material with 0.2% 1-thiol-2-naphthol for 7.0 hours at 280 - 285°C. under standard conditions a 35% yield of dimer and trimer fatty acid is obtained, with a D/T ratio of 3.7. In contrast, the thermally induced polymerization of the same fatty acid (run under identical conditions) yields a 19% yield of dimer-trimer product.

The evaluation of potential catalysts was carried out with the same commercial fatty acid utilized in Example 1 and in such a manner that up to 6 glass reactors could be subjected simultaneously to identical heating conditions. One of the reactors, serving as a control, contained fatty acid alone. The remainder of the reactors contained fatty acid and 0.2% (by weight) of potential catalyst. In this manner, the extent of catalyzed fatty acid polymerization is compared with the thermally-induced fatty acid polymerization in the control reaction.

EXAMPLE 8

This example demonstrates that a monomeric hydroxy aryl thiol, having an hydroxy group ortho to the sulfur is satisfactory in accelerating the fatty acid polymerization over the non-catalyzed reaction (control).

These two reactions are separately carried out at a temperature ranging from 270°C to 290°C. for about 3.0 hours. The results are listed below:

| Catalyst | % Dimer and Trimer Fatty Acids | D/T |
|---|---|---|
| 0 | 11.1 | 3.14 |
| 2,4'-dihydroxy thiophenol | 27.6 | 2.74 |

EXAMPLE 9

This example demonstrates that alkyl thiols and alkyl disulfides do not exhibit activity for the polymerization of any of the fatty materials greater than that observed for the control. This is contrary to U.S. Pat. No. 2,263,887 which discloses the use of alkyl disulfides for the polymerization of fatty oils. The results are presented below for several catalytic environments:

[A]
| | |
|---|---|
| Heating range | 275°C. for 4.0 hours |
| Catalyst | % Dimer and Trimer Fatty Acids |
| (a) none | 8.0 |
| (b) Dodecyl mercaptan | 8.2 |

[B]
| | |
|---|---|
| Heating range | 280°C. for 4.0 hours |
| Catalyst | % Dimer and Trimer Fatty Acids |
| (a) none | 16.0 |
| (b) Para-menthanedithiol | 17.7 |

[C]
| | |
|---|---|
| Heating range | 275°C. for 6.0 hours |
| Catalyst | % Dimer and Trimer Fatty Acids |
| (a) none | 13.8 |
| (b) Isobutyl disulfide | 13.5 |

EXAMPLE 10

This example demonstrates that phenols, free of ortho substituted thiols or sulfides, are inactive for the polymerization of fatty materials at 270°C. for 4.0 hours.

The results are tabularized in Table III below:

| Catalyst | % Dimer and Trimer Fatty Acids |
|---|---|
| None | 9.0 |
| para-Methoxyphenol | 9.4 |
| pyrogallic acid | 10.0 |
| 4-(Methylthio)-meta-cresol | 9.7 |
| ortho-nitrophenol | 9.1 |

I claim:

1. A process for the polymerization of fatty material which comprises heating in the presence of a steam blanket a fatty acid material containing both a carboxylic acid group and a major amount of diene linkages therein in the presence of an effective amount of a catalyst having the structure:

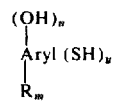

where $n$ is an integer from 1 to 4, $y$ is an integer from 1 to 3, R is a $C_1$-$C_{10}$ hydrocarbon group, said group being alkyl, cycloalkyl, cycloalkyl substituted alkyl, aryl substituted alkyl or alkaryl substituted alkyl, $m$ is an integer from 0 to 4 and the sum of $m$, $n$ and $y$ cannot exceed the substitutable positions on the aryl ring, said aryl ring being phenyl, naphthyl or phenanthryl and wherein at least one of said hydroxyl and said mercaptan groups are ortho positioned on the same aryl ring.

2. A process for the polymerization of fatty acid materials to products having a dimer to trimer ratio of at least 3 which comprises: heating in the presence of a steam blanket a vegetable or animal fatty acid material having a high diene content in the presence of an effective amount of the sulfur containing organic catalyst of claim 1.

3. The process according to claim 2 wherein the fatty acid material is selected from the group consisting of tall oil fatty acid, distilled tall oil, soy fatty acids, linoleic acid, and mixtures thereof.

4. The process according to claim 2 wherein the unsaturated fatty acid materials are heated from 1 to 16 hours at a temperature of from about 200°C. to about 300°C.

5. The process according to claim 2 wherein the unsaturated fatty acid materials are heated from about 2 to about 12 hours at a temperature of from about 250°C. to about 300°C.

6. The process according to claim 2 wherein the catalyst is 1-thiol-2-naphthol.

7. A method for the polymerization of fatty acid materials to obtain a product having a high dimer to trimer ratio which comprises: heating in the presence of a steam blanket an unsaturated fatty acid selected from the group consisting of tall oil fatty acids, distilled tall oil fatty acids, vegetable fatty acids, soy fatty acids, linoleic acid, cottonseed fatty acids and mixtures thereof at a temperature of from about 200°C. to about 300°C. for from 1 to 16 hours in the presence of from about 0.01% to about 2.0% by weight of catalyst based upon the total reaction mixture selected from the group consisting of 1-thiol-2-naphthol, 5-t-butyl-1-thiol-2-naphthol, 2,4-dihydroxythiophenol, and 2-hydroxy-thiophenol.

* * * * *